United States Patent

Davies

Patent Number: 5,547,130
Date of Patent: Aug. 20, 1996

[54] LOCK FOR AN ENGINE THRUST REVERSER

[75] Inventor: Stephen H. Davies, Telford, England

[73] Assignee: Lucas Industries public limited company, West Midlands, England

[21] Appl. No.: 317,711

[22] Filed: Oct. 4, 1994

[30] Foreign Application Priority Data

Oct. 5, 1993 [GB] United Kingdom .................. 9320447

[51] Int. Cl.$^6$ .................................................. F02K 1/76
[52] U.S. Cl. ...................................... 239/265.29; 60/226.2
[58] Field of Search ........... 239/265.19, 265.25–265.31; 60/226.2; 244/23 D

[56] References Cited

U.S. PATENT DOCUMENTS

| 4,424,669 | 1/1984 | Fage ........................................... 60/230 |
| 4,437,783 | 3/1984 | Halin et al. .......................... 239/265.27 |
| 4,468,941 | 9/1984 | Bascou . |
| 4,586,329 | 5/1986 | Carlin . |
| 4,790,495 | 12/1988 | Greathouse et al. ............... 239/265.29 |
| 4,922,713 | 5/1990 | Barbarin et al. ....................... 60/226.2 |
| 4,966,327 | 10/1990 | Fage et al. ......................... 239/265.29 |
| 5,035,379 | 7/1991 | Hersen et al. ......................... 244/129.4 |
| 5,267,760 | 12/1993 | Carlin . |
| 5,280,704 | 1/1994 | Anderson et al. ...................... 60/226.2 |
| 5,359,848 | 11/1994 | Davies .................................. 60/226.2 |
| 5,381,654 | 1/1995 | Halin ..................................... 60/226.2 |

FOREIGN PATENT DOCUMENTS

| 0542611 | 5/1993 | European Pat. Off. . |
| 0580352 | 1/1994 | European Pat. Off. . |

Primary Examiner—Andres Kashnikow
Attorney, Agent, or Firm—Trexler, Bushnell, Giangiorgi & Blackstone, Ltd.

[57] ABSTRACT

A lock is provided for locking a first door and a second door of an engine thrust reverser. The lock comprises a first and a second locking element for the first and second doors, respectively. The first and second locking elements are movable between a first and a second position for respectively preventing and permitting deployment of the first and second doors. A third locking member is provided and is movable between a first and a second position for preventing and permitting, respectively, movement of the first and second locking elements from the first positions and second positions thereof. An electromechanical actuator is arranged to move the third locking element from a first position to a second position thereof.

11 Claims, 3 Drawing Sheets

LOCK FOR AN ENGINE THRUST REVERSER

The present invention relates to a lock for use with an engine thrust reverser.

Thrust reverser systems act to direct the thrust produced by an aero-engine in a forward direction so as to decelerate an aircraft. One type of thrust reverser system for a fan engine comprises a plurality of doors 1 arranged around the periphery of an engine 2, as shown in FIG. 1 of the accompanying drawings. The engine shown in FIG. 1 has four such doors, two of which are shown.

FIG. 2 shows the doors 1 in the open position. Each door is operated by an associated hydraulic actuator 3. In the open position one part of the door extends outwardly to direct gas flow from the engine in a forward direction and another part of the door extends inwardly to impede the gas flow to the rear of the engine.

It is known to provide back-up locks to prevent accidental deployment of the thrust reversers. One such arrangement is described in EP 93305513.9, published as EP-A-0 580 352.

According to a first aspect of the invention, there is provided a lock for an engine thrust reverser, comprising a first locking element movable between a first position for preventing deployment of a first thrust reversing member and a second position corresponding to deployment of the first thrust reversing member, a second locking element movable between a first position for preventing deployment of a second thrust reversing member and a second position corresponding to deployment of the second thrust reversing member, a third locking element movable between first and second positions for preventing and permitting, respectively, movement of the first and second locking elements from the first positions to the second positions thereof, and an electromechanical actuator for moving the third locking element from the first position to the second position thereof.

Preferably the third locking element is biased towards the first position thereof. Preferably the first and second locking elements are biased towards the second positions thereof.

The first and second thrust reversing members may be doors provided on an engine for redirecting a flow of gas from the engine.

Preferably each of the first and second locking elements is a fork pivotable between the first and second positions thereof. Preferably, each fork is urged towards the respective second position by a torsion spring.

Preferably each of the first and second locking elements is arranged to engage a respective closure pin or lip secured to or integral with the respective thrust reversing member. Preferably no force is applied to the first and second locking elements from each thrust reversing member so as to urge the locking elements towards the respective second positions when the thrust reversing members are at inoperative positions.

Preferably the lock will not unlock when a load is applied by the first and second thrust reversing members to the first and second locking elements so as to urge them to their respective second positions, even when a command to unlock has been given to the lock.

Preferably the electromechanical actuator is a solenoid. The third locking element may comprise a primary locking pin for selectively engaging and disengaging respective actuating rods movable with the respective first and second locking elements.

The or each closure pin may cooperate with the respective fork to move the fork to the first position during the movement of the respective thrust reversing member to the closed or inoperative position.

According to a second aspect of the present invention there is provided an engine thrust reverser comprising at least two thrust reversing members and a plurality of locks for locking each thrust reversing member at an inoperative position, at least one of which locks is a lock according to the first aspect of the present invention.

Preferably the or each lock according to the first aspect of the present invention is arranged such that it is not subjected to a load when the thrust reversing members are at the closed or inoperative position and the or each other lock is locked to secure the thrust reversing members.

Advantageously the locks engage the thrust reversing member at respective different positions. For example, a closure pin may be provided for cooperation with each of the first and second locking elements. If more than one lock requires a closure pin, then more than one closure pin, or a closure pin divided into first and second portions with a support therebetween, may be provided. By ensuring that each of the first and second locking elements engages the thrust reversing member at a different respective position, a high integrity locking system may be provided having increased protection against accidental operation of a thrust reverser.

The present invention will further be described, by way of example, with reference to the accompanying drawings, in which.

Figure 1:
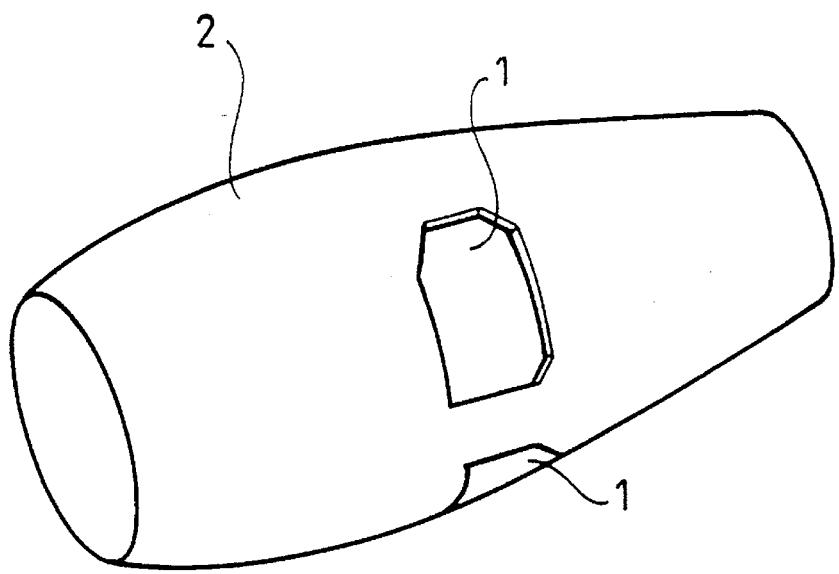
FIG. 1 is a perspective view of a gas turbine aero-engine having a door type thrust reverser system.
Figure 2:
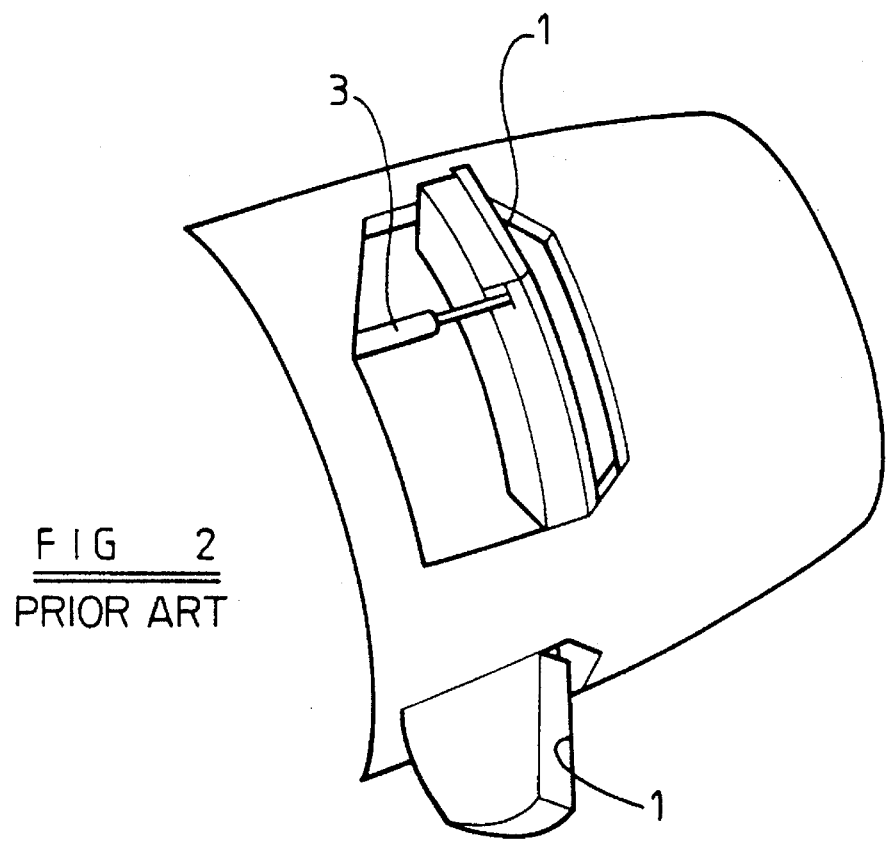
FIG. 2 shows the reverser shown in FIG. 1 in the operating position.
Figure 3:
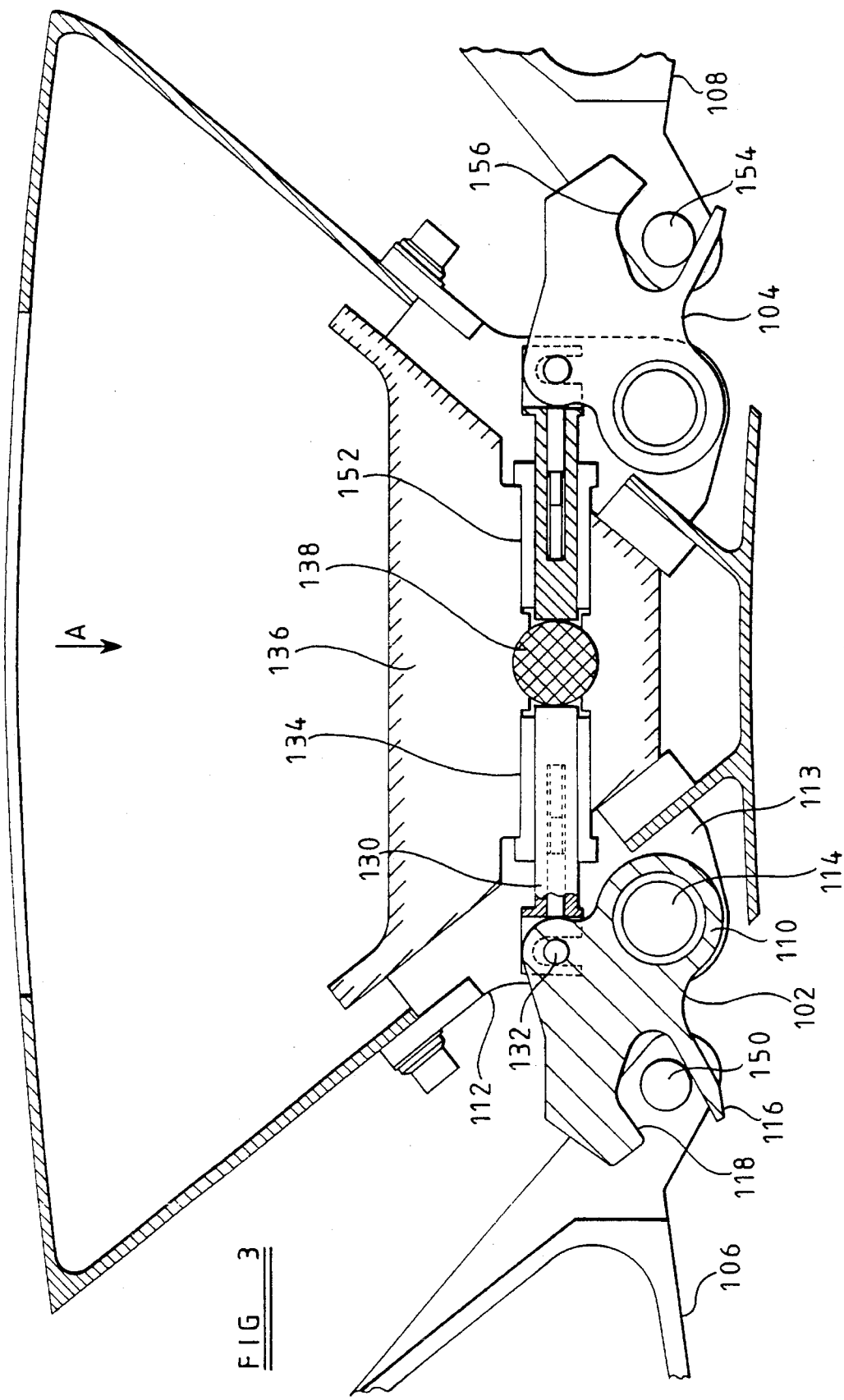
FIG. 3 is a cross sectional diagram of a thrust reverser lock constituting an embodiment of the present invention.

The lock illustrated in FIG. 3 has first and second forks 102 and 104 for engaging locking regions of first and second thrust reversing doors 106 and 108, respectively. The first fork 102 has a lug 110. A first support member 112 has a pair of lugs 113 reaching around either side of the lug 110, so as to embrace the first fork 102. The first fork 102 has a circular aperture cut in the lug 110, which aligns with similar holes in the lugs 113 of the support member 112. A pivot 114 passes through the aperture in the lug 110 and the holes in the lugs 113 of the support member 112 so as to pivotally secure the first fork 102 to the first support member 112. The first fork 102 has a generally "C" shaped recess facing away from the pivot 114. A lower edge 116 of the first fork 102 extends further from the pivot 114, i.e. further to the left as shown in FIG. 3, than does an upper edge 118 of the first fork 102. The lower edge of the "C" shaped recess runs substantially parallel with the lower edge of the first fork 102.

A first fork actuating rod 130 is pivotally attached, at a first end thereof, to the first fork 102 by a pivot pin 132 extending either side of the first fork 102 at a region distant from the pivot 114. The first fork actuating rod is axially slidable, in a direction perpendicular to the axis of the pivot 114, within a cylindrical passage 134 formed within a lock body 136. The first fork actuating rod 130 has open hooks grasping the pivot pin 132 at either side of the first fork 102. The provision of the hooks accommodates the limited motion of the pin 132 perpendicular to the axis of the rod 130, which results from the pivoting of the first hook 102 about the pivot 114.

A second end of the first actuating rod 130 abuts a primary actuating pin 138 when the primary actuating pin is at a first position, corresponding to a locked position. The primary actuating pin is movable, by a solenoid 140, between the first position and a second position for unlocking the lock. The abutment between the first fork actuating rod 130 and the primary actuating pin 138 prevents the first fork 102 from moving from the position shown in FIG. 3, and thereby holds the lock locked. The first fork 102 is biased to move to an unlocked position, that is pivot in a clockwise direction, by a helical torsion spring 115 acting on the fork at a region adjacent the pivot 114 FIG. 3 shows the first thrust reversing door at its stowed, i.e. inoperative, position. The first fork 102 holds a closure pin or door member 150 within the "C" shaped recess. Motion of the door to a deployed position is prevented while the first fork is at the position shown in FIG. 3, since such motion would cause the door member 150 to bear against, and be arrested by, the upper edge 118 of the fork 102.

The second fork 104 is arranged as a mirror image of the first fork and cooperates with corresponding components.

Figure 4:
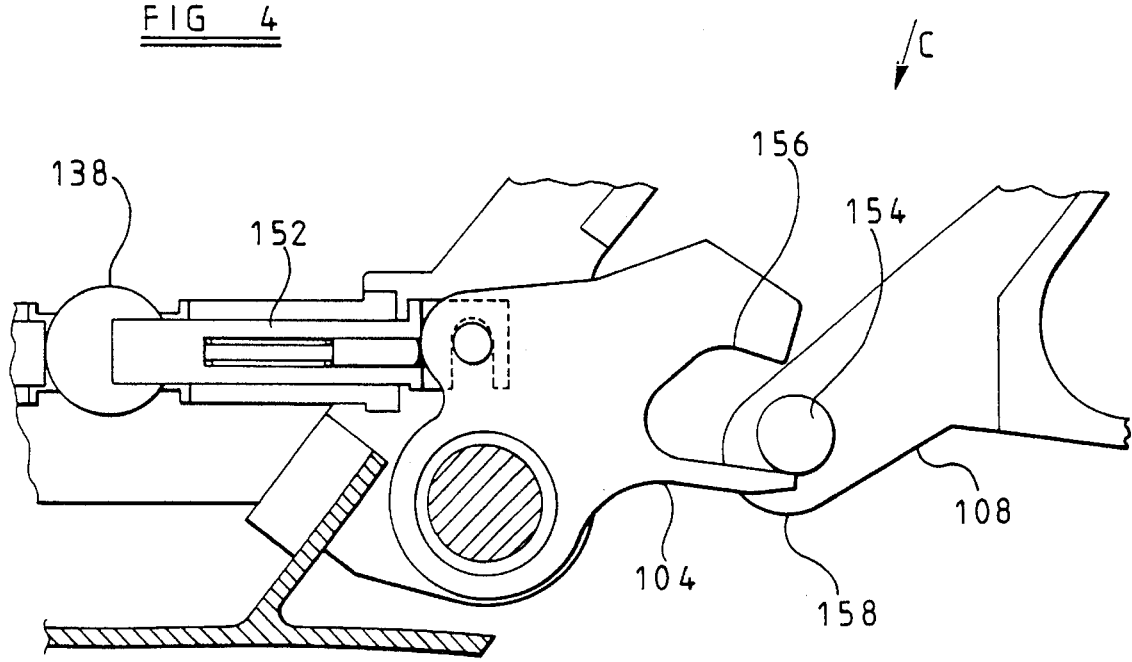
FIG. 4 shows part of the lock of FIG. 3 at the deploy position with the door moved slightly from its stowed position.

To unlock the lock, the solenoid 140 is operated to retract the primary actuating pin 138 so that it does not abut the first fork actuating rod 130 or a second fork actuating rod 152. Subsequent deployment of the thrust reversing doors, for example the second door 108 as shown in FIG. 4, causes the fork 104 to pivot towards the unlocked position under the action of its respective helical spring 115. Movement of the second fork 104 moves the upper surface 156 (corresponding to surface 118 on the first fork 102) of the "C" shaped recess out of the path of the door member 154 of the second door, thereby allowing the door to proceed to the fully deployed position. The second fork actuating rod 152 extends into the space that had been occupied by the primary actuating pin 138 while the pin 138 was at its first position.

Closure of the door 108 causes the door member 154 to move in the direction of arrow C (FIG. 4). During the final phase of closing the door, the door member 154 comes into contact with the extended lower edge 158 (corresponding to edge 116 of the first fork 102). Further movement of the door 108 returns the second fork to the position shown in FIG. 3. The solenoid 140 is de-energised so as to return the primary actuating rod 138 to its first position, thereby preventing either of the first or second forks 102 and 104 from moving away from their locked positions, as illustrated in FIG. 3.

Each door of the thrust reverser is actuated by the respective hydraulic actuator 3 which includes an internal lock to lock the actuator in the door closed (inoperative) position. Furthermore each door has a primary lock which is mechanically latched when the door is in the closed position. The primary lock comprises a hook which is selectively engagable with a door pin. The locking mechanism within the hydraulic actuator is referred to as a secondary lock. The primary and secondary locks act to hold the door 1,106,108 against an air tight seal and each is released by the application of hydraulic pressure when deployment of the door is required and hydraulic pressure is applied to operate the actuator. At least one of the primary and secondary locks is under load when the door is at the closed position.

Figure 5:
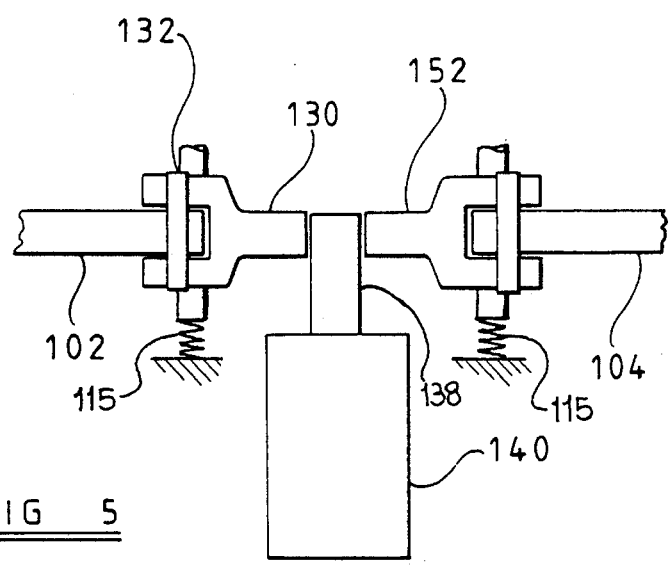
FIG. 5 is a schematic diagram of the lock shown in FIG. 3 viewed from the direction of arrow A.

In use, the lock illustrated in FIGS. 3 to 5 acts as a tertiary lock. The door members 150 and 154 are arranged not to abut the upper surface 118 and 156 of the "C" shaped recesses when one or both of the primary and secondary locks of door each are engaged at the end of the door closing stroke of the actuator. Thus the only force to urge the forks 102 and 104 to the open position is provided by the torsion spring at the respective pivots, and this force is opposed by the door members 150 and 154 of the first and second door, respectively. Consequently little or no force acts between the primary actuating pin 138 and the first fork and second fork actuating rods 130 and 152.

If the primary and secondary locks are accidentally unlocked, for example due to a fault in the hydraulic control lines to the locks, no electrical signal to unlock will be transmitted to the solenoid 140 and the primary actuating pin 138 will remain in the extended position. Aerodynamic forces and the force provided by a seal around the accidentally unlocked door causes the door to move until the door member engages the upper surface of the "C" shaped recess of the respective fork and causes the fork to become loaded in the opening direction. The force exerted by the door on the fork causes the fork actuating rod to bear heavily against the primary actuating pin 138. This force causes sufficient friction between the primary actuating pin 138 and the fork actuating rod to hold the primary actuating pin against longitudinal movement even if, due to a further fault, the solenoid is actuated to retract the pin 138. Thus the doors are prevented from being deployed inadvertently.

The slight movement of the door to the position when the door pin member engages the upper part of the "C" shaped recess may be detected by micro-switches positioned around the door, for example in the supporting frame of the aero-engine adjacent the door. The micro-switches may provide a signal to the pilot and/or a flight control computer to warn of a fault within the thrust reverser and to inhibit transmission of the electrical signal to actuate the solenoid 138.

The lock body 136 acts to strengthen the engine casing in the region of the lock, thereby enhancing the ability of the engine casing to resist deformation when subjected to a load, such as might be experienced during use of the lock or operation of the thrust reverser.

It is possible that the lock according to the present invention may be used in conjunction with only one of the primary and secondary locks to provide a locking system requiring both an hydraulic and an electrical failure to cause inadvertent deployment of one or more thrust reverser members.

I claim:

1. A lock for an engine thrust reverser having first and second thrust reversing members, said lock comprising a first locking element, a second locking element, a third locking element and an electromechanical actuator, said first locking element being movable between a first position for preventing deployment of the first thrust reversing member and a second position corresponding to deployment of the first thrust reversing member, said second locking element being movable between a first position for preventing deployment of the second thrust reversing member and a second position corresponding to deployment of the second thrust reversing member, said third locking element being movable between first and second positions for preventing and permitting, respectively, movement of said first and second locking elements from the first positions to the second positions thereof, and said electromechanical actuator being arranged to move said third locking element from the first position to the second position thereof.

2. A lock as claimed in claim 1, in which said third locking element is biased towards its first position.

3. A lock as claimed in claim 1, in which said first and second locking elements are biased towards their respective second positions.

4. A lock as claimed in claim 3, further comprising first and second torsion springs, each of said first and second locking elements being a fork pivotable between the first and second positions thereof and each being urged towards its respective second position by a respective one of said first and second torsion springs.

5. A lock as claimed in claim 1, in which each of said first and second locking elements is arranged to engage a respective closure pin forming part of the respective thrust reversing member.

6. A lock as claimed in claim 1, in which said first and second thrust reversing members and said first and second locking elements are arranged such that no force is applied to said first and second locking elements from said respective thrust reversing member so as to urge said locking elements towards their respective second positions when the thrust reversing members are at inoperative positions.

7. A lock as claimed in claim 1, in which said lock is inhibited from unlocking upon application of a force to either of said first and second locking elements by the thrust reversing members acting to urge either of said first and second locking elements towards their respective second positions.

8. A lock as claimed in claim 1, in which said electromechanical actuator is a solenoid.

9. A lock as claimed in claim 1, further comprising first and second actuating rods movable with said first and second locking elements, respectively, and in which said third locking element is a locking pin for selectively engaging and disengaging said actuating rods.

10. An engine thrust reverser comprising at least first and second thrust reversing members and at least one lock for locking each thrust reversing member at an inoperative position, at least one of said locks comprising a first locking element, a second locking element, a third locking element and an electromechanical actuator, said first locking element being movable between a first position for preventing deployment of the first thrust reversing member and a second position corresponding to deployment of the first thrust reversing member, said second locking element being movable between a first position for preventing deployment of the second thrust reversing and a second position corresponding to deployment of the second thrust reversing member, said third locking element being movable between first and second positions for preventing and permitting, respectively, movement of said first and second locking elements from the first positions to the second positions thereof, and said electromechanical actuator being arranged to move said third locking element from the first position to the second position thereof.

11. An engine thrust reverser as claimed in claim 10, in which said at least one lock is unstressed when said thrust reversing members are at their inoperative positions and at least one other lock is locked to secure said thrust reversing members.

* * * * *